No. 660,957. Patented Oct. 30, 1900.
H. HERMANS.
FOOT WARMER.
(Application filed Mar. 26, 1900.)

(No Model.)

Witnesses

Helena Hermans Inventor
By her Attorneys,

UNITED STATES PATENT OFFICE.

HELENA HERMANS, OF TACOMA, WASHINGTON.

FOOT-WARMER.

SPECIFICATION forming part of Letters Patent No. 660,957, dated October 30, 1900.

Application filed March 26, 1900. Serial No. 10,280. (No model.)

*To all whom it may concern:*

Be it known that I, HELENA HERMANS, a citizen of the United States, residing at Tacoma, in the county of Pierce and State of Washington, have invented a new and useful Foot-Warmer, of which the following is a specification.

This invention relates to foot-warmers in general, and more particularly to the class of portable foot-warmers that are adapted for use in beds, in vehicles, and wherever else it may be desired to maintain the proper temperature for the feet, one object of the invention being to provide a structure comprising a casing for the heat-holding body so formed as to prevent excessive radiation and consequent injury to fabrics or other materials that may be in contact therewith.

A further object of the invention is to provide a novel and effective lock for the casing which will prevent accidental opening of the casing and to provide a handle which will serve for carrying the heat-holding body when removed from the casing and for carrying the casing when the body is contained therein.

Figure 1:
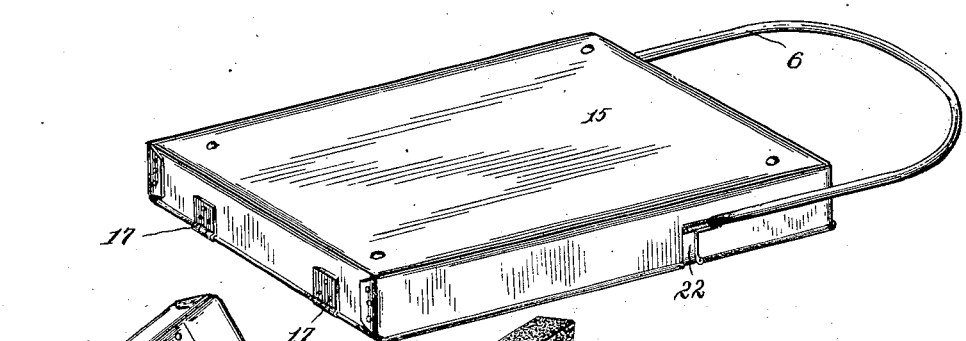
Figure 2:
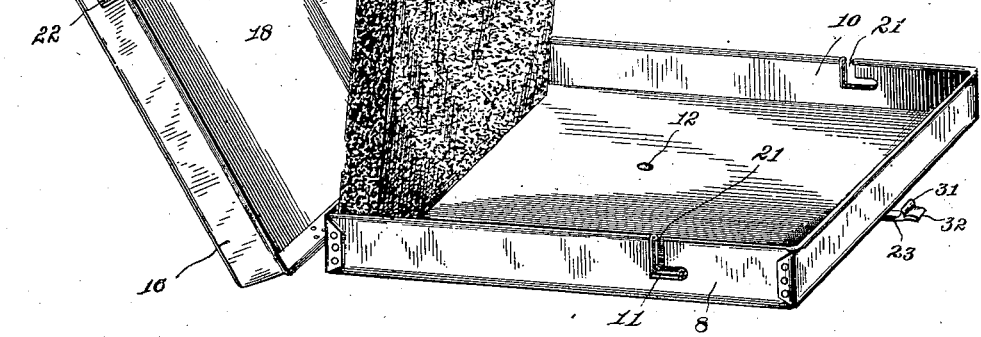
Figure 3:
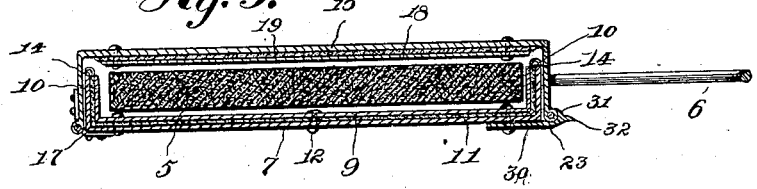

In the drawings forming a portion of this specification, and in which similar numerals of reference designate like and corresponding parts in the several views, Figure 1 is a rear perspective view showing the foot-warmer with the heat-holding body in its casing. Fig. 2 is a perspective view showing the casing open and illustrating the attachment of the handle to the heat-holding body. Fig. 3 is a longitudinal section of Fig. 1 and showing the asbestos lining for the casing.

Referring now to the drawings, the foot-warmer of the present invention comprises a heat-holding body 5, which is preferably of soapstone, although it may be of any other suitable material, and which body has alining perforations in its edges, with which are engaged the inwardly-bent ends of a bail 6, this mode of attachment of the bail being common and requiring no specific illustration. The bail is of sufficient length to permit a swinging movement of the body 5, as illustrated in Figs. 1 and 2. In connection with this heat-holding body there is employed a casing comprising a box-like body portion including a plate 7 of suitable metal, having its edges 8 bent upwardly at right angles thereto, the corners of the body portion of the casing being riveted, as illustrated in Figs. 1 and 2. A second and smaller plate 9 has its edges 10 bent upwardly to form a box-like lining, and which lining is disposed within the body portion of the casing and has a layer of asbestos 11 or other suitable material of proper thickness disposed in the interspace between it and the body of the casing. A rivet 12 is passed through the plate 7 and the bottom of the lining to hold the lining from buckling, and to further insure against displacement of the lining the edges of the body portion of the casing are curled inwardly over a wire 14 to lie upon the edges of the lining and hold the latter in position.

A cover for the casing consists of a plate 15, having its edges bent downwardly at right angles thereto, as shown at 16, to form sides for the cover, and the corners of the cover are riveted in the same manner as the body of the casing. This cover is attached to the body portion of the casing by means of hinges 17, which are riveted, and the top portion of the cover is provided with a metallic lining 18 in the form of a plate, which is riveted thereto and has a suitable thickness of asbestos 19 or other similar material disposed between it and the cover. By means of this hinge connection between the cover and the body of the casing the cover may be moved into and out of operative relation to the body portion.

In the sides of the body portion of the casing, and preferably adjacent that end farthest from the hinge connection with the cover, there are formed two alining slots 21, which extend downwardly from the edge of the body portion for substantially one-half the height of the casing and are then continued longitudinally, so that they are L-shaped, the longitudinal portions extending in a direction away from the hinge connection with the cover. In the sides of the cover are formed two similar alining slots 22, the longitudinal portions of which extend in a direction away from the hinge of the cover and are so disposed that these longitudinal portions will register with the corresponding portions of the slots 21, and thus form, in effect, perforations in the sides of the casing when the cover is lowered. As illustrated in Fig. 1 of the drawings, the bail 6 is so positioned with respect to the heat-holding body 5 that when this heat-holding body is inclosed by the casing the perforations therein which receive the bail will aline with the slots in the sides of the casing, and when the heat-holding body is dropped into place the inwardly-turned portions of the bail between the sides of the bail and the body are passed downwardly and into the slots 21. The cover is then closed down to cause the slots 22 to receive the inturned portions of the bail, and by then drawing the bail longitudinally of the casing the heat-holding body is moved and the bail engaged with the longitudinally-extending portions of the slots 21 and 22. This effects a locking of the cover through the body of the casing, and the bail may then be grasped to carry the casing, with its inclosure, from place to place. When it is desired to remove the heat-holding body, it is moved rearwardly of the casing, after which the cover may be raised, and the body may then be withdrawn. The thickness of the asbestos lining employed is such as will permit a gradual radiation of heat and at the same time will so reduce the conductivity of the casing as to prevent such a radiation as would scorch clothing.

As an additional means for holding the two parts of the casing together there is provided a spring-hook 30, the stem of which is riveted to one element of the casing, as shown, and the bill 31 of which hook is adapted to snap over the bead at the edge of the end of the cover. This hook has a finger-piece 32, by means of which it may be moved from engagement with the bead, and this finger-piece also forms a handle by means of which the base of the casing may be held, while the cover is raised through the medium of the bail 6. While this spring-hook is shown in the drawings herewith, it will of course be understood that any suitable form of catch may be employed which will have the double function of retaining the cover in place and affording a handle. It will further be understood that in practice any suitable materials may be used for the different parts of this device, and the size and proportions thereof may be varied as desired without departing from the spirit of the invention.

What is claimed is—

1. A foot-warmer comprising a casing including a body portion and a cover, and a heat-retaining body provided with a bail, said body being movable within the casing to engage the bail with the body of the casing and its cover and hold the cover in its closed position.

2. A foot-warmer comprising a casing including a hollow body portion and a hollow cover therefor, openings in the sides of the body portion and cover and adapted for alinement when the cover is closed, and a heat-retaining body adapted to lie within the casing and having a bail adapted to enter said openings and hold the cover in position upon the body of the casing.

3. A foot-warmer comprising a metallic casing, heat-insulating material within the casing, a lining for the casing disposed upon the insulating material, openings in the casing, and a heat-retaining body adapted to lie within the casing and having a bail adapted for projection through the openings to lie exteriorly of the casing.

4. A foot-warmer comprising a casing including a body portion having sides, and a cover having sides adapted to lie against the sides of the body portion, slots formed inwardly from the edges of the sides of the body portion and extending longitudinally thereof at their inner ends, similar slots formed in the sides of the cover and adapted to aline their longitudinally-extending portions with the corresponding portions of the first-named slots when the cover is closed, and a heat-holding body adapted to lie within the casing and provided with a bail, said bail being adapted to engage the slots of the casing and lie in the longitudinally-extending portions thereof to hold the cover in place.

In testimony that I claim the foregoing as my own I have hereto affixed my signature in the presence of two witnesses.

HELENA HERMANS.

Witnesses:
GEORGE P. CRAMER,
Miss L. SWEET.